United States Patent
Lube et al.

(10) Patent No.: US 7,673,898 B2
(45) Date of Patent: Mar. 9, 2010

(54) DEVICE FOR MOUNTING A MODULE CARRIER ON THE STEERING WHEEL OF A MOTOR VEHICLE

(75) Inventors: Thomas Lube, Berlin (DE); Andreas Pradel, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 469 days.

(21) Appl. No.: 11/715,138

(22) Filed: Mar. 7, 2007

(65) Prior Publication Data

US 2007/0209470 A1   Sep. 13, 2007

(30) Foreign Application Priority Data

Mar. 7, 2006   (DE) .................. 20 2006 003 920 U

(51) Int. Cl.
*B60R 21/203* (2006.01)
*B62D 1/10* (2006.01)

(52) U.S. Cl. .............. 280/731; 280/728.2; 74/552; 74/484 R; 74/498

(58) Field of Classification Search .............. 280/731, 280/728.2, 771; 74/552, 484 R, 498
See application file for complete search history.

(56) References Cited

U.S. PATENT DOCUMENTS

| | | | |
|---|---|---|---|
| 4,561,324 A * | 12/1985 | Hiramitsu et al. .............. 74/498 |
| 4,598,603 A | 7/1986 | Hiramitsu et al. |
| 4,602,523 A | 7/1986 | Kurata et al. |
| 4,729,254 A * | 3/1988 | Nogami et al. ............ 74/484 R |
| 4,796,482 A | 1/1989 | Hiramitsu et al. |

| | | | |
|---|---|---|---|
| 2004/0067809 A1 | 4/2004 | Hoersch et al. |
| 2004/0221670 A1 | 11/2004 | Becker et al. |

FOREIGN PATENT DOCUMENTS

| | | |
|---|---|---|
| DE | 34 35 021 A1 | 4/1985 |
| DE | 3435021 A | 4/1985 |
| DE | 3619340 A1 | 12/1986 |
| DE | 10118663 A1 | 10/2002 |
| DE | 10320328 A1 | 12/2004 |

OTHER PUBLICATIONS

A search report dated Sep. 24, 2007, from the European Patent Office in corresponding European Application No. 07101786.7-1264.

* cited by examiner

Primary Examiner—Ruth Ilan
Assistant Examiner—Keith Frisby
(74) Attorney, Agent, or Firm—Fitch, Even, Tabin & Flannery

(57) ABSTRACT

A device is provided for mounting a module carrier on a rotatable steering wheel of a motor vehicle in such a manner that the angular position of the module carrier remains constant during a rotation of the steering wheel, with a first toothed ring connected in a rotationally fixed manner to the module carrier, a lever, which is mounted on the steering wheel via a bearing section in a manner such that it can pivot to and fro between two positions, a first toothed wheel, which is mounted rotatably on a first arm of the lever and meshes with the first toothed ring in a first position of the lever, and elastic means for pressing the first toothed wheel elastically against the first toothed ring so that rotation of the steering wheel in one direction causes a rotation of the module carrier in the opposite direction. For actuating the lever, the lever has a second arm which is connected via the bearing section to the first arm of the lever.

31 Claims, 4 Drawing Sheets

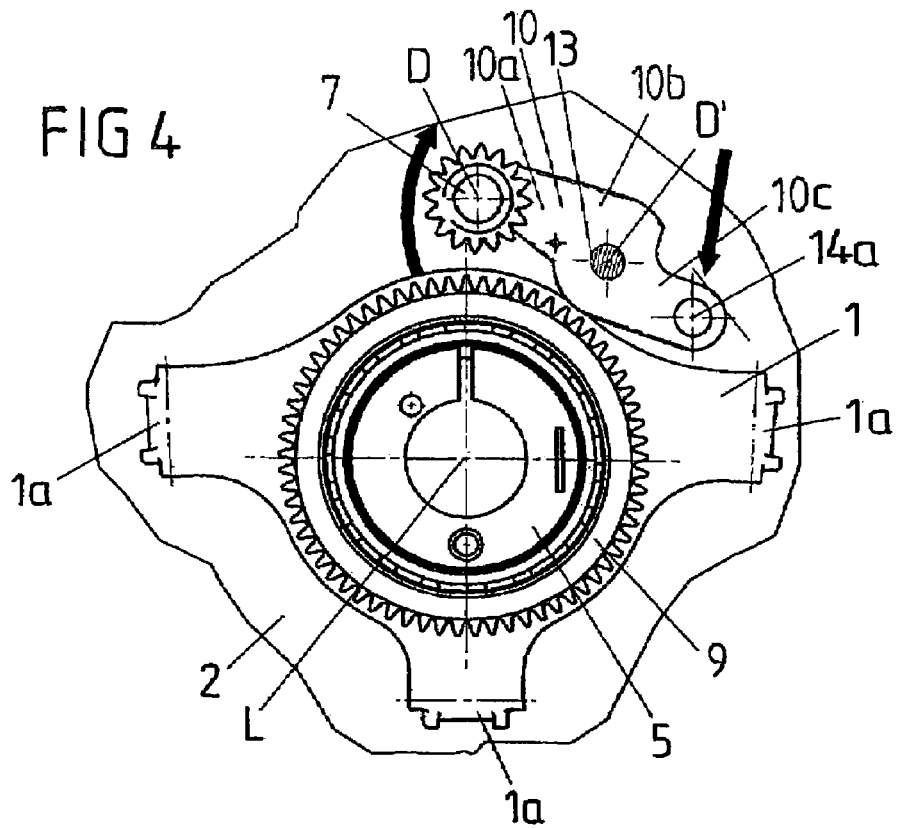
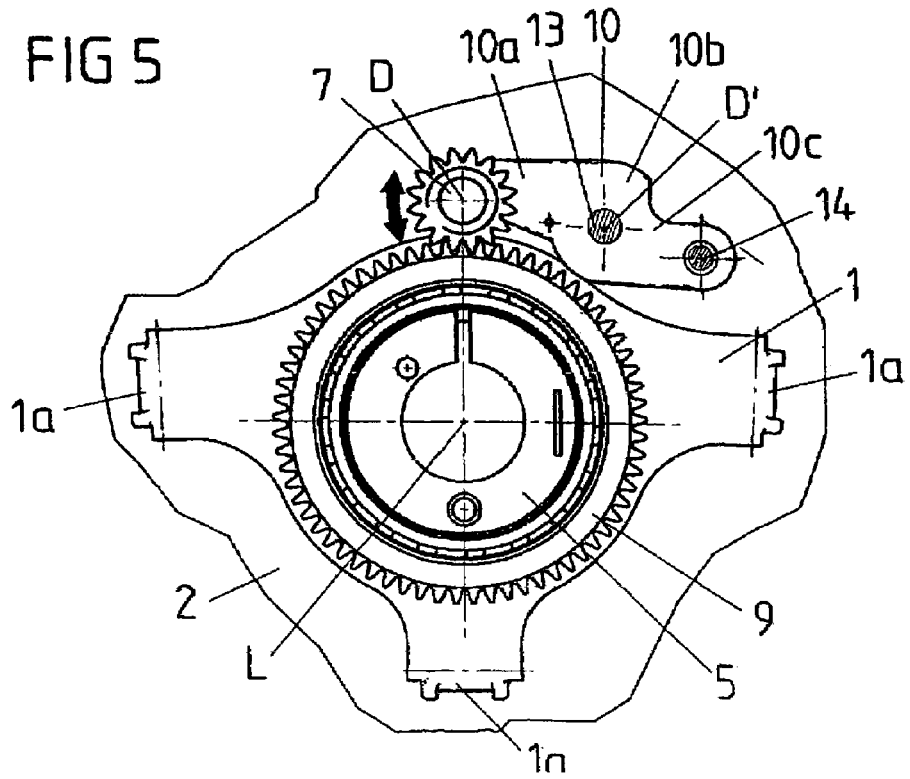

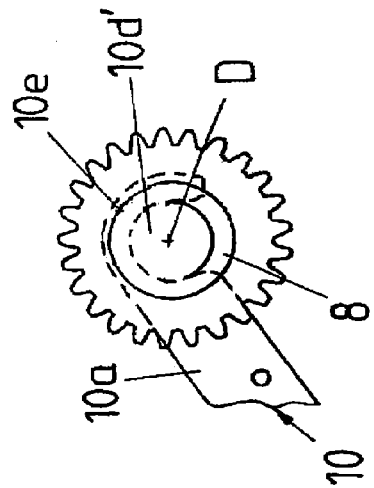
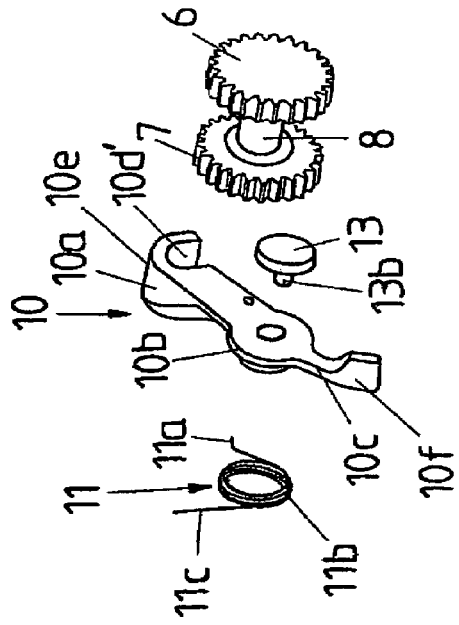
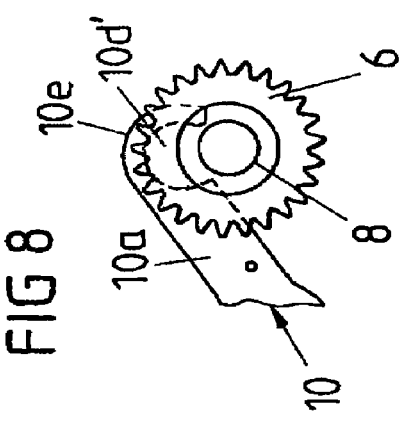
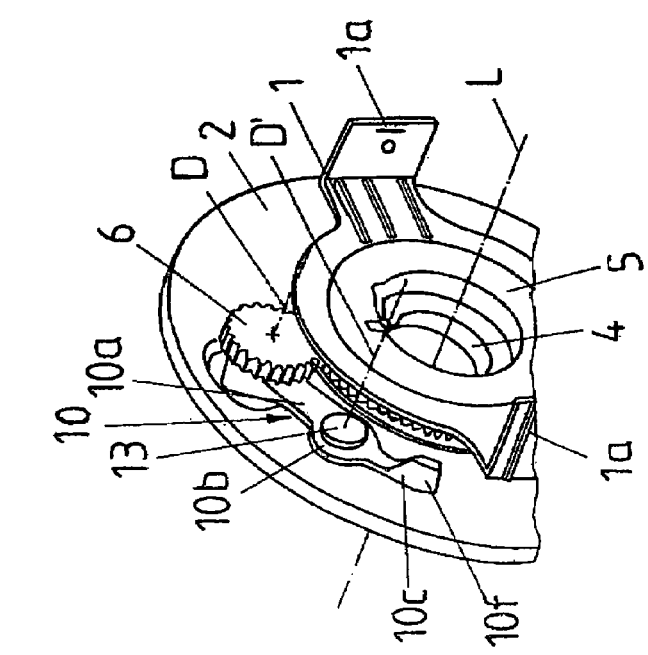

DEVICE FOR MOUNTING A MODULE CARRIER ON THE STEERING WHEEL OF A MOTOR VEHICLE

CROSS-REFERENCE TO RELATED APPLICATIONS

The German priority application No. 20 2006 003 920.1, filed Mar. 7, 2006, is hereby incorporated by reference.

FIELD OF THE INVENTION

The invention relates to a device for rotatably mounting a module carrier on the steering wheel of a motor vehicle.

BACKGROUND OF THE INVENTION

A device of this type is used for mounting a module carrier, in particular a module carrier for an airbag module, on a steering wheel, which can be rotated about a steering axis, of a motor vehicle in such a manner that the angular position of the module carrier remains constant during a rotation of the steering wheel about the steering axis in order, for example in the event of a crash, to always ensure an optimum, reproducible positioning of an inflatable airbag which can be deployed out of the airbag module. The module carrier can also bear a display module, the displays of which can always be readily read because of the constant angular position of the module carrier in space.

A device of this type usually comprises a first toothed ring connected in a rotationally fixed manner to the module carrier, a lever, which is mounted on the steering wheel via a bearing section of the lever in a manner such that it can pivot to and fro between two positions, and a first toothed wheel, which is mounted rotatably at a distance from the bearing section on a first arm of the lever, which arm is connected to the bearing section, and meshes with the first toothed ring in a first position of the lever, with elastic means being provided which are arranged in order to press the first toothed wheel elastically against the first toothed ring. The first toothed wheel interacts here with the steering wheel in such a manner that a rotation of the steering wheel in one direction causes a rotation of the module carrier, which is connected to the first toothed ring, in the opposite direction, and therefore the angular position of the module carrier in a coordinate system fixed on the vehicle remains constant. Owing to the fact that the first toothed wheel is pressed elastically against the first toothed ring by means of the lever, a play in the above pairing of gear wheels, which play is caused by manufacturing tolerances and distortions during operation, is compensated for. A device of this type is known from DE 3435021.

SUMMARY OF THE INVENTION

The invention is based on the problem of providing a device of the type mentioned at the beginning in such a manner that simple and rapid installation of the device is possible.

This problem is solved by a device for rotatably mounting a module carrier on the steering wheel of a motor vehicle as described hereinafter.

According thereto, it is provided that to actuate the lever, the lever has a second arm which is connected via the bearing section to the first arm of the lever.

Via this second arm, the first toothed wheel, which is mounted on the lever, can advantageously be brought, during installation or removal, into engagement with or can be disengaged from the first toothed ring. The second arm of the lever is therefore particularly preferably designed as a manually actuable actuating element which is provided and arranged in order to pivot the lever manually from the first position into a second position (and vice versa), with the first toothed wheel being disengaged from the first toothed ring in the second position. This considerably simplifies the installation and removal of the device.

The second arm is preferably of widened design at a free end transversely with respect to a direction of extent of the second arm, along which direction the second arm extends longitudinally. By this means, the second arm, which is designed as an actuating element, can advantageously be actuated in a simple manner by means of a finger tip, for example with the first finger joint of a thumb, or by means of a suitable tool.

The first arm of the lever, on which arm the first toothed wheel is mounted, is preferably also designed such that it is extended longitudinally along this direction of extent, i.e. it is preferably aligned with the second arm of the lever. In one variant of the invention, the first arm and the second arm are essentially identical in terms of length along the direction of extent.

A fixing element which can be fastened releasably to the steering wheel is preferably provided and is arranged in order to limit a pivoting of the lever out of the first position in such a manner that the first toothed wheel, which is mounted on the first arm of the lever, no longer touches the first toothed ring. In this case, the fixing element is preferably designed in order to limit the pivoting out in such a manner that the first toothed wheel does not become disengaged from the first toothed ring. For this purpose, the fixing element preferably reaches through a continuous recess which is formed on a free end region of the second arm, with the inside diameter of the recess being larger than the outside diameter of the fixing element in the region of this recess. The inside diameter of the recess is larger than the outside diameter of the fixing element by an extent such that the lever can execute a pivoting movement about its first position, which serves to compensate for the play of the intermeshing teeth of the first toothed ring and of the first toothed wheel, with it not being possible, because of the fixing element, for the lever to be pivoted out of the first position to an extent such that the first toothed wheel can become disengaged from the first toothed ring.

The lever is preferably mounted pivotably on a hub of the steering wheel, via which the steering wheel can be mounted on the motor vehicle in a manner such that it can rotate about the steering axis. The second arm (actuating element) is preferably designed and mounted on the hub in such a manner that it is exposed along the steering axis at a distance from the hub. This advantageously creates space for the manual actuation of the second arm, which is designed as an actuating element. However, in the completely fitted state of the device, the second arm may be concealed or encased by another component of the device.

The elastic means are preferably coupled to the lever in such a manner that the latter presses the first toothed wheel elastically against the first toothed ring in the first position of the lever. In this case, elastic means in the form of a torsion spring are preferably provided. In one variant of the invention, the torsion spring is fixed on the lever via a first free section of the torsion spring and on the hub of the steering wheel via a second free end section. In this case, a central section of the torsion spring, which section connects the two free end sections of the torsion spring to each other, is coiled around an axis of rotation about which the lever is mounted pivotably on the hub. This axis of rotation preferably runs parallel to the steering axis of the steering wheel.

The first toothed wheel is preferably mounted rotatably on the first arm of the lever via a shaft. For this purpose, the first arm preferably has a U-shaped bearing recess into which the shaft is preferably clipped. In this case, the bearing recess engages around at least some sections of the cross section of the shaft in the clipped-in (or latched-in) state in such a manner that the shaft can only be disengaged from the bearing recess by bending up the bearing recess, i.e. by applying a force. The shaft preferably runs parallel to the steering axis.

The first toothed wheel is preferably connected to a second toothed wheel via the shaft. In this case, the first toothed wheel may be connected integrally to the second toothed wheel. Such a pair of planet wheels may be manufactured, for example, from a thermoplastic.

In one variant of the invention, the hub has a cutout, through which the shaft is guided, at a distance from the steering axis. The two toothed wheels are therefore arranged along the steering axis on both sides of the hub.

A second toothed ring is preferably provided, which toothed ring is designed for the rotationally fixed mounting on the motor vehicle and meshes with the second toothed wheel of the pair of planet wheels. This second toothed ring can be arranged, for example, on a steering column or on a covering of the steering column. The two toothed rings are preferably arranged coaxially with the steering axis, with, preferably, the outside diameter of the second toothed ring being identical in size to the outside diameter of the first toothed ring. Furthermore, it is provided that the two toothed rings have the same number of teeth. The two toothed wheels also preferably have the same number of teeth and have an identically sized outside diameter.

The second toothed wheel is arranged and provided in order to mesh with the second toothed ring. In this case, the elastic means interact with the lever in such a manner that the latter also presses the second toothed wheel elastically against the second toothed ring in the first position of the lever.

The first toothed ring, which is fastened to the module carrier, and the second toothed ring, which is fastened on the vehicle, are coupled to each other via the pair of planet wheels, which is formed from the first toothed wheel and the second toothed wheel and also the shaft, and therefore a rotation of the steering wheel in one direction causes a rotation of the module carrier, which is connected to the first toothed ring, in the opposite direction, to be precise in such a manner that the angular position of the module carrier in a coordinate system fixed on the vehicle remains constant.

BRIEF DESCRIPTION OF THE DRAWINGS

Further details and advantages of the invention are explained below with reference to descriptions of figures of exemplary embodiments.

In the figures:

FIG. 4 shows a plan view of the device shown in FIG. 2, from a side of the device that faces away from a driver, FIG. 5 shows the device shown in FIG. 4, wherein the toothed wheels and the toothed rings according to FIG. 3 are in engagement with one another, FIG. 6 shows a modification of the device shown in FIG. 1, FIG. 7 shows an exploded illustration of part of the device shown in FIG. 6, FIG. 8 shows a cutout of the lever which is illustrated in FIGS. 6 and 7 and into which a shaft of the pair of planet wheels is clipped, and FIG. 9 shows a view, by way of a cutout, of the lever which is shown in FIG. 8, with the shaft of the pair of planet wheels clipped in.

DETAILED DESCRIPTION OF THE PREFERRED EMBODIMENTS

Figure 1:
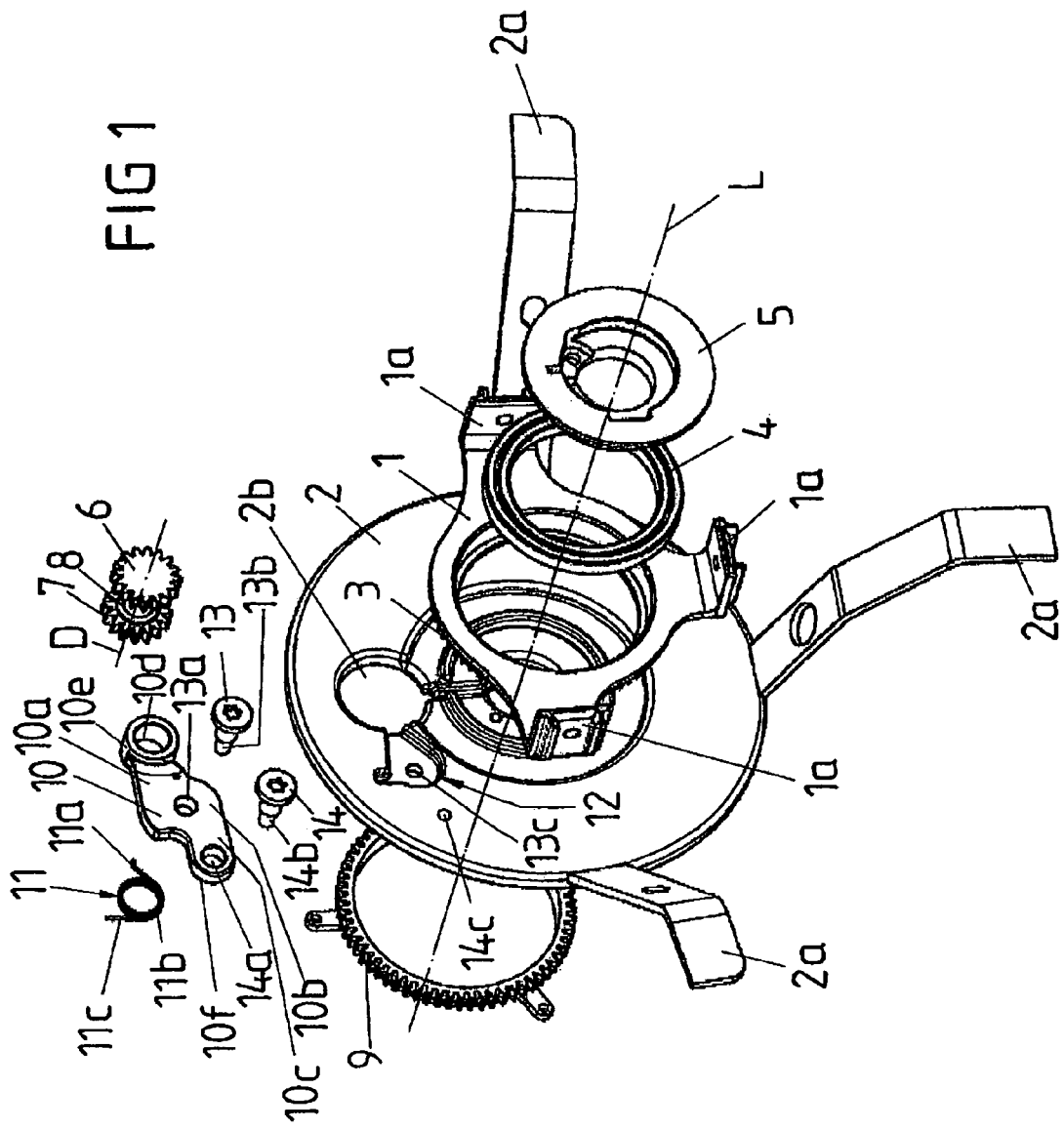
FIG. 1 shows an exploded illustration of a device for mounting a module carrier on a rotatable steering wheel of a motor vehicle.
Figure 2:
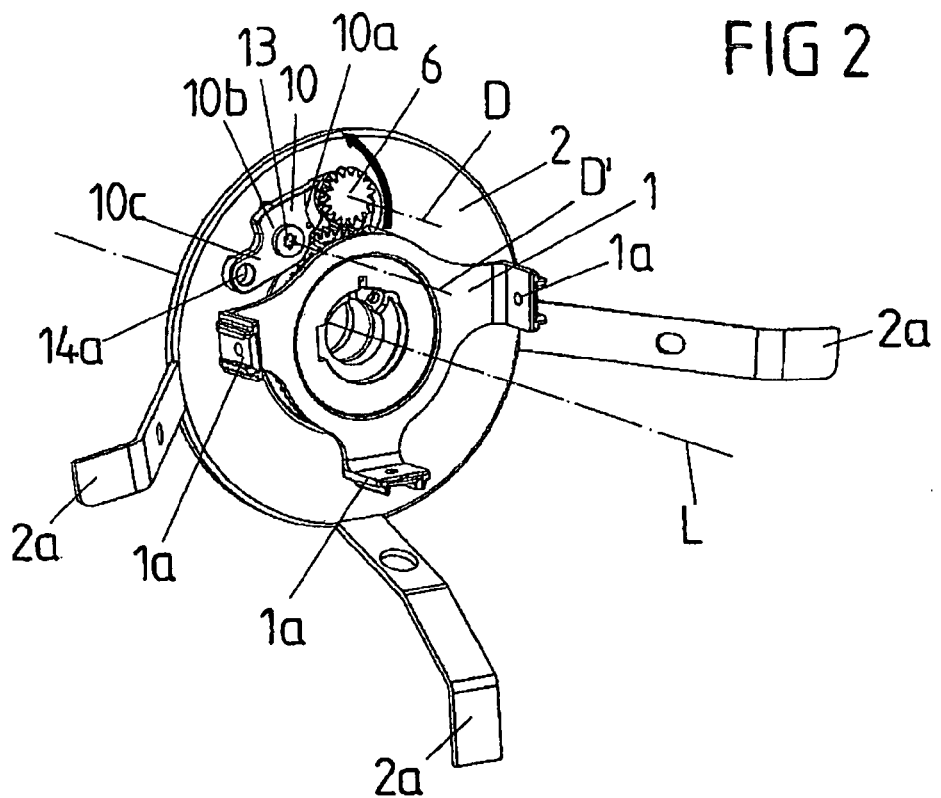
FIG. 2 shows the device shown in FIG. 1, with a lever as a carrier of a pair of planet wheels, wherein the lever is arranged in a second position, in which the toothed wheels of the pair of planet wheels are disengaged from the toothed rings assigned to the toothed wheels.
Figure 3:
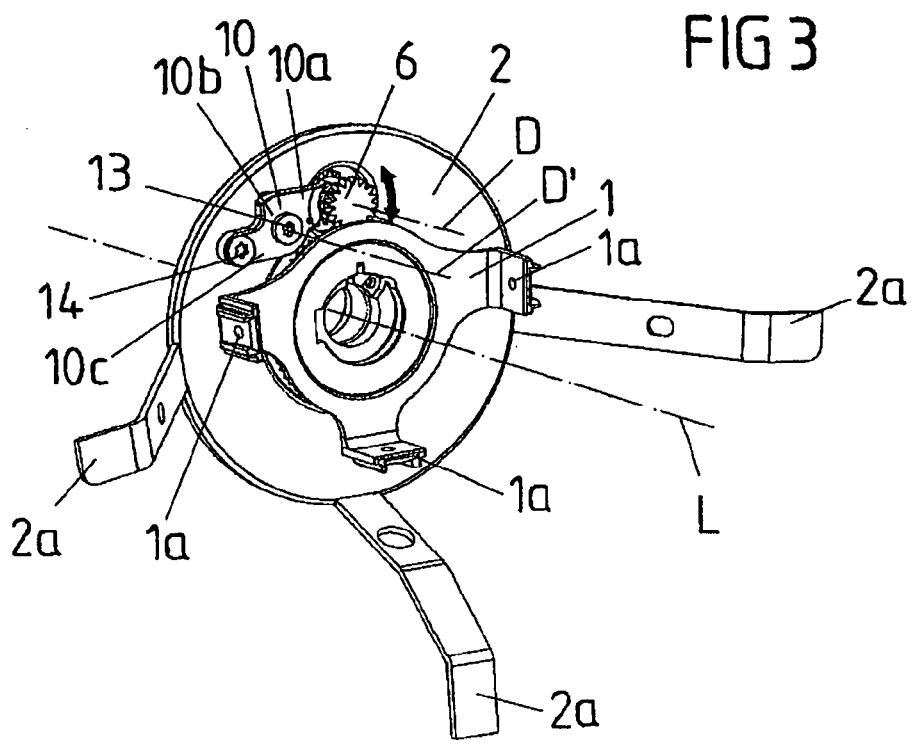
FIG. 3 shows the device shown in FIG. 2, wherein the lever bearing the pair of planet wheels is arranged in a first position, in which the pair of planet wheels meshes with the toothed rings.

FIG. 1 shows, in conjunction with FIGS. 2 to 5, a device for mounting a module carrier 1 on a hub 2 of a steering wheel, which device can be mounted on a motor vehicle in a manner such that it can be rotated about a steering axis L. The text below will be based on a state of the device in which it is fitted into a motor vehicle. The device comprises a first toothed ring 3 which is arranged coaxially with the steering axis L and is connected in a rotationally fixed manner to a side of the module carrier 1, which side faces away from a driver. The module carrier 1 is of essentially annular design and encircles the steering axis L transversely with respect to the latter. In order to fasten a module to the module carrier 1, the module carrier 1 has three fastening elements 1a which protrude along the steering axis L (in the direction of a driver) from the module carrier 1. In accordance with its annular design, the module carrier 1 has a continuous cutout which is aligned with a recess of the hub 2, the cutout serving to receive a ball bearing 4, which is of annular design and via which the module carrier 1 is mounted rotatably on the hub 2. In order to fix the ball bearing 4, a clamping ring 5 is provided which, in order to fix the ball bearing 4, is pressed against the ball bearing 4 along the steering axis L by a screw connection (not illustrated).

The hub 2 is of essentially planar design and extends in a plane of extent running perpendicularly to the steering axis L. From an outer encircling edge of the hub 2, three spoke segments 2a, which are spaced apart with respect to one another along the edge, protrude from the hub 2 and, together with the hub 2, form part of a steering wheel carcass to which a steering wheel rim carcass or a steering wheel rim can be fastened via free end regions of the spoke segments 2a. The hub 2 has a cutout 2b which is continuous along the steering axis L and is spaced apart from the steering axis L transversely with respect thereto, to be precise in such a manner that the spacing between the steering axis L and a center of the cutout 2b is larger than an outer radius of the first toothed ring 3 with respect to the steering axis L. A pair of planet wheels is inserted into the cutout 2b, which pair of planet wheels has a first toothed wheel 6 and a further, second toothed wheel 7, which is arranged parallel to the toothed wheel 6, which toothed wheels are connected to each other via a shaft 8 running along the steering axis L. The pair of planet wheels is arranged in the cutout 2b of the hub 2 in such a manner that the first toothed wheel 6 of the pair of planet wheels is in engagement with the first toothed ring 3, which is fixed on that side of the module carrier 1 which faces the hub 2. In this case, the hub 2 is arranged along the steering axis L behind the first toothed wheel 6, as viewed by a driver, and the second toothed wheel 7, which is connected to the first toothed wheel 6 via the shaft 8, is arranged along the steering axis L behind the hub 2, as viewed by a driver, and is in engagement with a second toothed ring 9, which is connected in a rotationally fixed manner to the motor vehicle, for example the steering column. Or put another way, the hub 2 is mounted rotatably on the motor vehicle in such a manner that it is arranged along the steering axis L between the first toothed ring 3, which is fixed on the module carrier, and the second toothed ring 9, which is fixed on the vehicle. The two toothed rings (sun wheels) 3, 9 are coupled to each other via the pair of planet wheels, the shaft 8 of which runs along the steering axis L through the cutout 2b of the hub 2.

The outside diameters of the first toothed ring 3 and of the second toothed ring 9 are identical in size and the number of teeth thereof are identical. The same also applies to the two toothed wheels 6, 7 of the pair of planet wheels. The pair of planet wheels is mounted on the hub 2 via the shaft 8, connecting the two toothed wheels 6, 7 to each other, by means of a lever 10 such that the first and the second toothed wheels 6, 7 of the pair of planet wheels are rotatable about an axis of rotation D which runs parallel to the steering axis L and is aligned with the shaft 8.

The lever 10 serves to press the first toothed wheel 6 and the second toothed wheel 7 elastically against the first toothed ring 3 and the second toothed ring 9 in order to mesh with said two toothed rings 3, 9. This compensates for a play between the toothed wheel pairings of first toothed wheel 6/first toothed ring 3, on the one hand, and second toothed wheel 7/second toothed ring 9, on the other hand. The lever 10 is of two-armed design and accordingly has a first arm 10a with a free end region 10e on which a continuous bearing cutout 10d, in which the shaft 8 is mounted rotatably about the axis of rotation D, is formed. The first arm 10a of the lever 10 is connected via a bearing section 10b of the lever 10, via which bearing section the lever 10 is mounted on the hub 2 in a manner such that it can pivot about an axis of rotation D' running parallel to the steering axis L, to a second arm 10c which protrudes from the bearing section 10b of the lever 10 in the opposite direction to the first arm 10a.

The force by means of which the first arm 10a of the lever 10 presses the pair of planet wheels with the two toothed wheels 6, 7 against the two toothed rings 3, 9 along a direction perpendicular to the steering axis L, is provided by a torsion spring 11. The torsion spring 11 has a first free end section 11a, via which it is fastened to the lever 10 and which is connected via a central section 11b of the torsion spring 11 to a second free end section 11c of the torsion spring 11, via which end section the torsion spring 11 is fixed to the hub 2. For this purpose, the hub 2 has a recess 12 for receiving both the central section 11b and the second free end section 11a of the torsion spring 11. The lever 10 is mounted via its bearing section 10b on the hub 2 in a manner such that it can pivot by means of a bolt 13 aligned with the axis of rotation D'. For this purpose, the bolt 13 reaches through a cutout 13a of the bearing region 10b and is fixed with a free end region 13b in a cutout 13c formed in the recess 12 of the hub 2. The bolt 13 may be designed, for example, as a screw which is screwed with its free end region 13b, which has a thread, into the cutout 13c. The central section 11b of the torsion spring 11 is coiled about the bolt 13, i.e. about the axis of rotation D', along the axis of rotation D' of the lever 10 between the lever 10 and the hub 2.

The second arm 10c of the lever 10, which arm leads away from the bearing section 10b, is designed as a manually actuable actuating element via which the lever 10 can be pivoted counter to the force provided by the torsion spring 11 into a second position, in which the pair of planet wheels is disengaged from the two toothed rings 3, 9. For this purpose, the actuating element 10c is pressed towards the first toothed ring 3 along a direction perpendicular to the steering axis L. This second position of the lever 10 corresponds to an installation position, in which the device can easily be fitted or removed. In particular, in this second position of the lever 10, the hub 2 and the module carrier 1 can be arranged particularly easily in their correct positions, since, in the second position of the lever 10, the pair of planet wheels does not obstruct the positioning of these components of the device with respect to the second toothed ring 9 or the hub 2 (in the case of the module carrier 1).

The actuating element 10c can be fixed by means of a fixing element 14, which is designed as a bolt, engages for this purpose in a continuous cutout 14a of a free end region 10f of the actuating element 10c and is fixed releasably by a free end region 14b in a cutout 14c of the hub 2 (for example, by screwing to the cutout 14c). The fixing of the actuating element 10c by means of the bolt 14 takes place in the first position of the lever 10, to be precise in such a manner that, in the fixed state, the lever 10 can execute a pivoting movement about its axis of rotation D', which pivoting movement is limited by the bolt 14 in such a manner that the first toothed wheel 6, which is mounted on the first arm 10a of the lever 10, and the second toothed wheel 7, which is mounted there, precisely cannot become disengaged from the first toothed ring 3 and the second toothed ring 9, respectively.

Owing to the coupling of the first toothed ring 3 to the second toothed ring 9, which is fixed on the vehicle, via the two toothed rings 6, 7, which are connected to each other (via the shaft 8), the following function of the above-described device arises. When the hub 2 is rotated about the steering axis L, the shaft 8, which is guided through the recess 2b of the hub 2, is carried along in the direction of rotation, and the second toothed wheel 7 of the pair of planet wheels rolls along the second toothed ring 9, which is fixed on the vehicle. The resultantly produced rotational movement of the shaft 8 about its axis of rotation D is transmitted by means of the first toothed wheel 6 of the pair of planet wheels, which execute an identical (directionally identical) movement to the rotational movement of the second toothed wheel 7, to the first toothed ring 3 in such a manner that the rotational movement of the first toothed ring 3 is opposed to the rotational movement of the two toothed wheels 6, 7 and therefore also of the steering wheel or of the hub 2 (reversing mechanism). By this means, the module carrier 1, which is connected to the first toothed ring 3, is rotated in the opposite direction relative to the hub 2 (steering wheel).

In this case, the two toothed wheels 6, 7 and the two toothed rings 3, 9 are designed with regard to their number of teeth and dimensions in such a manner that the angle of rotation of the steering wheel or of the hub 2 with respect to the second toothed ring 9 is essentially identical in size to the angle of rotation of the module carrier 1 in the opposite direction. A rotation of the hub 2 in one direction therefore causes a rotation of the module carrier 1, which is mounted on the hub 2, in the opposite direction relative to the hub 2, to be precise by the same angle of rotation, and therefore the angular position of the module carrier 1, which is mounted rotatably on the hub 2, in a coordinate system fixed on the vehicle remains constant.

FIG. 6 shows a modification of the device, shown in FIGS. 1 to 5, for mounting a module carrier 1 on a steering wheel. In this case, in contrast to FIGS. 1 to 5, there is no fixing element 14 in the form of a bolt for securing the lever 10 in a first position, in which the pair of planet wheels mounted on the lever 10 (toothed wheels 6, 7 connected to each other via the shaft 8) meshes with the first toothed ring 3 or the second toothed ring 9. The lever 10 is held merely by the force, which is exerted on the lever 10 by means of the elastic means 11, in the first position, in which the toothed wheels 6, 7, which are mounted on the first arm 10a of the lever 10, are pressed against the two toothed rings 3, 9 in order to mesh therewith. The second arm 10c of the lever 10, which arm is formed as an actuating element, has, in an ergonomically advantageous manner, a widened portion on a free end region 10f, which widened portion is arranged and provided for actuation of the actuating element 10c by finger pressure. In order to convey the lever 10 into its second position, in which the toothed wheels 6, 7 are disengaged from the toothed rings 3, 9, the widened end region 10f of the actuating element 10c of the lever 10 is acted upon by finger pressure with a force which is directed at the steering axis L along a direction perpendicular to the steering axis L such that the first arm 10a of the lever 10 lifts off from the first toothed ring 3 (and from the second toothed ring 9) in such a manner that the toothed wheels 6, 7, which are mounted on the first arm 10a, become disengaged from the two toothed rings 3, 9.

FIG. 7 shows an exploded illustration of the lever 10 of FIG. 6, with the elastic means (spring means), which are designed as a torsion spring 11, the bolt 13 for the pivotable mounting of the lever 10 about the axis of rotation D', and the integrally formed pair of planet wheels, comprising the first toothed wheel 6 and the second toothed wheel 7, which are connected to each other via the cylindrical shaft 8. In order to mount the shaft 8 on the first arm 10a of the lever 10, the first arm 10a has, at its free end 10e, a U-shaped bearing recess 10d, which faces the first toothed ring 3 and into which the shaft 8 of the pair of planet wheels according to FIG. 8 and FIG. 9 is clipped, such that the shaft 8 is engaged around by the first arm 10a of the lever 10 in such a manner that the said lever is fixed in the bearing recess 10d in a manner such that it can rotate about the axis of rotation D.

What is claimed is:

1. Device for mounting a module carrier on a rotatable steering wheel of a motor vehicle in such a manner that the angular position of the module carrier remains constant during a rotation of the steering wheel, with
    a first toothed ring connected in a rotationally fixed manner to the module carrier,
    a lever, which is mounted on the steering wheel via a bearing section in a manner such that it can pivot to and fro between two positions,
    a first toothed wheel, which is mounted rotatably on a first arm of the lever and meshes with the first toothed ring in a first position of the lever, and
    elastic means, which are arranged and provided in order to press the first toothed wheel elastically against the first toothed ring, the first toothed wheel interacting with the steering wheel in such a manner that a rotation of the steering wheel in one direction causes a rotation of the first toothed ring, in the opposite direction, and therefore the angular position of the module carrier remains constant,
characterized in that, to actuate the lever, the lever has a second arm which is connected via the bearing section to the first arm of the lever.

2. Device according to claim 1, characterized in that the second arm of the lever is designed as an actuating element with which the lever can be pivoted manually from the first position into a second position, in which the first toothed wheel is disengaged from the first toothed ring.

3. Device according to claim 1, characterized in that the second arm is of widened design at a free end.

4. Device according to claim 1, characterized in that the second arm of the lever is designed such that it extends longitudinally along a direction of extent.

5. Device according to claim 4, characterized in that the first arm is designed such that it extends longitudinally along the direction of extent.

6. Device according to claim 4, characterized in that the first arm and the second arm are essentially identical in terms of length along the direction of extent.

7. Device according to claim 1, characterized in that a fixing element which can be fixed releasably to the steering wheel is provided and is arranged in order to limit a pivoting of the lever out of the first position.

8. Device according to claim 7, characterized in that the fixing element is designed in order to limit the pivoting out in such a manner that the first toothed wheel cannot be disengaged from the first toothed ring.

9. Device according to claim 7, characterized in that the fixing element for limiting the pivoting out reaches through a continuous recess of a free end region of the second arm.

10. Device according to claim 9, characterized in that an inside diameter of the recess is larger than an outside diameter of the fixing element within the recess.

11. Device according to claim 1, characterized by a hub of the steering wheel, via which the steering wheel can be mounted on the motor vehicle in a manner such that it can pivot about a steering axis and on which the lever is pivotably mounted.

12. Device according to claim 11, characterized in that the second arm is arranged along the steering axis at a distance from the hub.

13. Device according to claim 11, characterized in that the elastic means comprises a torsion spring that has a first free end section, via which it is fixed on the lever, and in that the torsion spring has a second free end section, via which it is fixed on the hub.

14. Device according to claim 13, characterized in that the torsion spring has a central section which connects the two free end sections of the torsion spring to each other and in the process encircles an axis of rotation of the lever that is parallel to the steering axis.

15. Device according to claim 11, characterized in that the lever is mounted on the hub in a manner such that it can pivot about an axis of rotation, and in that the axis of rotation runs parallel to the steering axis.

16. Device according to claim 1, characterized in that the elastic means interact with the lever in such a manner that the latter presses the first toothed wheel elastically against the first toothed ring in the first position of the lever.

17. Device according to claim 1, characterized by elastic means in the form of a torsion spring.

18. Device according to claim 1, characterized in that the first toothed wheel is mounted rotatably on a free end region of the first arm of the lever via a shaft.

19. Device according to claim 18, characterized in that the first arm has a U-shaped bearing recess on its free end region for the mounting of the shaft.

20. Device according to claim 19, characterized in that the shaft is clipped into the bearing recess.

21. Device according to claim 18, characterized in that the shaft extends along a steering axis of the steering wheel.

22. Device according to claim 18, characterized in that the first toothed wheel is coupled to a second toothed wheel via the shaft.

23. Device according to claim 22, characterized in that the first toothed wheel and the second toothed wheel have the same number of teeth.

24. Device according to claim 22, characterized in that the outside diameter of the first toothed wheel is identical in size to the outside diameter of the second toothed wheel.

25. Device according to claim 22, characterized in that the second toothed wheel meshes with a second toothed ring being arranged and provided for the rotationally fixed mounting on the motor vehicle.

26. Device according to claim 25, characterized in that the elastic means interact with the lever in such a manner that the latter presses the second toothed wheel elastically against the second toothed ring in the first position of the lever.

27. Device according to claim 18, characterized in that the shaft is guided through a cutout in a hub of the steering wheel.

28. Device according to claim 1, characterized by a second toothed ring which is arranged and provided for the rotationally fixed mounting on the motor vehicle so that the second toothed ring causes rotation of the meshed first toothed wheel and the first toothed ring when the steering wheel is rotated.

29. Device according to claim 28, characterized in that the first toothed ring is arranged coaxially with a steering axis of the steering wheel, and the second toothed ring is arranged coaxially with the steering axis.

30. Device according to claim 28, characterized in that the outside diameter of the second toothed ring is identical in size to the outside diameter of the first toothed ring.

31. Device according to one of claims 28, characterized in that the first toothed ring and the second toothed ring have the same number of teeth.

* * * * *